US012270138B2

(12) United States Patent
Santa Cruz

(10) Patent No.: US 12,270,138 B2
(45) Date of Patent: *Apr. 8, 2025

(54) ADDITIVE TO IMPROVE PROPERTIES OF ASPHALT CEMENT CONCRETE AND METHOD OF MANUFACTURING THEREOF

(71) Applicant: Surface Tech LLC, La Jolla, CA (US)

(72) Inventor: Steven Santa Cruz, San Diego, CA (US)

(73) Assignee: Surface Tech LLC, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,614

(22) Filed: Sep. 25, 2023

(65) Prior Publication Data

US 2024/0011209 A1    Jan. 11, 2024

Related U.S. Application Data

(63) Continuation of application No. 17/118,213, filed on Dec. 10, 2020, now Pat. No. 11,767,625.

(51) Int. Cl.
*D06C 27/00* (2006.01)
*D02J 13/00* (2006.01)
*C08L 95/00* (2006.01)

(52) U.S. Cl.
CPC ............ *D06C 27/00* (2013.01); *D02J 13/006* (2013.01); *C08L 95/00* (2013.01)

(58) Field of Classification Search
CPC ........ C08L 95/00; D06C 27/00; D02J 13/006; C04B 40/0039; C04B 26/26; C04B 2103/40; C04B 14/06; C04B 16/0691; C04B 40/0082; C04B 103/40; C04B 2111/0075

See application file for complete search history.

(56) References Cited

U.S. PATENT DOCUMENTS

| 6,348,093 | B1 | 2/2002 | Rieder et al. |
| 2003/0134925 | A1 | 7/2003 | Guzauskas |
| 2014/0274815 | A1 | 9/2014 | Lovett et al. |
| 2015/0078823 | A1 | 3/2015 | Lang et al. |
| 2015/0140219 | A1 | 5/2015 | Swamy et al. |
| 2016/0068735 | A1 | 3/2016 | Biddle et al. |
| 2016/0244362 | A1 | 8/2016 | Lang et al. |
| 2017/0291852 | A1 | 10/2017 | Santa Cruz |

*Primary Examiner* — Vishal V Vasisth
(74) *Attorney, Agent, or Firm* — Procopio, Cory, Hargreaves & Savitch LLP

(57) ABSTRACT

Reinforcing filaments or fibers, such as aromatic polyamide (aramid) fibers, can be reliably measured and consistently mixed into asphalt cement concrete by soaking the fibers in a wetting agent, then severing them to a desired length, and mixing the segments with other ACC ingredients. The wetting agent holds the fibers together loosely, so they can be distributed more uniformly throughout the ACC without clumping. The wetting agent soaks into the ACC mixture and/or evaporates, leaving the reinforcing fibers behind.

20 Claims, 4 Drawing Sheets

ADDITIVE TO IMPROVE PROPERTIES OF ASPHALT CEMENT CONCRETE AND METHOD OF MANUFACTURING THEREOF

CONTINUITY AND CLAIM OF PRIORITY

This application is a continuation of U.S. patent application Ser. No. 17/118,213, filed on Dec. 10, 2020, now U.S. Pat. No. 11,767,625, the disclosure of which is incorporated herein in its entirety.

FIELD

The invention relates generally to a reinforcement composition and method of reinforcing asphalt and asphalt-concrete composite pavement. More specifically, the invention relates to methods of preparing reinforcing fibers and of using such fibers in the mixing of asphalt concrete pavement.

BACKGROUND

Asphalt concrete or asphalt cement concrete ("AC," "ACC" or often just "asphalt") is widely used as a paving material to surface roads, runways and parking lots. By some estimates, up to 90% of all such surfaces are made with AC. A basic asphalt concrete comprises asphalt (also known as bitumen), a highly-viscous or semi-solid form of petroleum; and aggregates such as stone, sand or gravel, in about a 1:19 ratio (5% asphalt, 95% aggregate). The ingredients are heated, mixed, spread on the surface to be paved (often an earthen, stone or crushed-rock bed) and compacted to form AC. The asphalt (bitumen) binds the aggregate particles together, and when the temperature is "low enough," the mixture is strong and tough. (At higher temperatures, asphalt cement concrete softens and can be damaged more easily. Thus, temperature is an important variable in all of mixing/manufacturing, application and service conditions.)

The energy required to heat the asphaltic binder for mixing and to keep the mixture hot during transport to the installation site is significant, so a variety of alternate formulations have been developed to improve the overall efficiency of the process. For example, the bitumen may be mixed with a lighter-weight petroleum solvent, or may be emulsified in a surfactant solution to produce an aggregate binder that functions at lower temperatures. These products are generally known as "warm mix asphalt" or "cold mix asphalt."

A variety of trace ingredients can be added to asphalt concrete to improve its strength, durability, performance or construction characteristics. In addition, careful control of aggregate size, shape and composition can significantly improve AC characteristics. Because of the enormous amount of AC used around the world, even modest improvements in performance or handling can yield significant benefits.

In the context of a related paving material, cement concrete or Portland cement concrete, it is known that the introduction of various types of fibers to the basic Portland cement and aggregate mixture can improve strength and toughness of the resulting concrete. Similar fibers have also been used with asphalt concrete to good effect, but differences between cement concrete and asphalt concrete's manufacturing and handling requirements make it more difficult to introduce fibers into asphalt concrete. (For example, the elevated temperatures and vigorous mixing required by AC damages or destroys many fibers that work well with cement concrete, and it is challenging to prevent small, lightweight fibers from blowing away before they are captured and secured into the asphalt/aggregate mixture, or from clumping together and becoming coated with bitumen before they can be distributed throughout the mixture.)

One favorable method of introducing reinforcing fibers into standard ("hot mix") asphalt concrete is described in U.S. Pat. No. 9,469,944 (2016) by Lang and Sturtevant. The method is to prepare aramid-fiber segments coated or soaked with a wax binder that melts when the segments are introduced into the heated asphalt concrete during mixing. The elevated temperatures during mixing cause the binder to melt, releasing both fibers and binder into the AC, where further mixing distributes them.

Alternative methods of preparing reinforcing fibers for use in warm- and cold-mix asphalt concrete may provide greater control over the quantity and distribution of the fibers in the finished pavement, leading to improved pavement characteristics, improved energy-efficiency and reduced construction cost.

SUMMARY

Embodiments of the invention pre-treat reinforcing fibers with a wetting agent before introducing segments of the treated fiber into an asphalt concrete mixture. The wetting agent weighs down the segments, binds the fibers together loosely through surface tension and capillary action, and reduces fibrillation so that the segments are less likely to be carried away by heat and turbulence before they are captured into the AC mix. Once captured, the wetting agent evaporates or degrades and leaves the fibers behind so that they can be individually coated with bitumen and can help hold the aggregate particles together.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
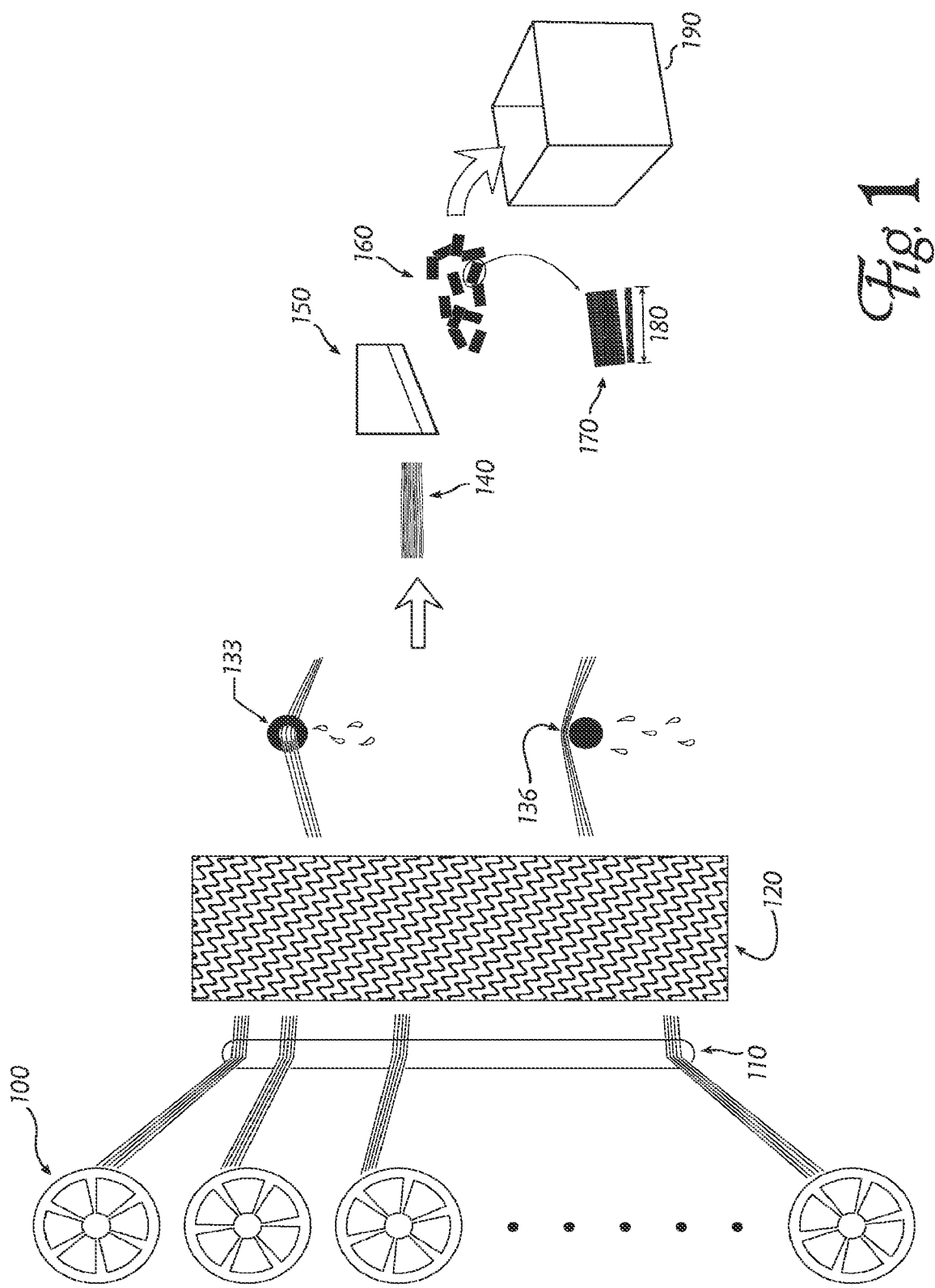
FIG. 1 is a process diagram illustrating supplies and equipment involved in manufacturing an asphalt cement concrete additive according to an embodiment of the invention.

Embodiments of the invention address challenges arising in the manufacture of certain types of asphalt concrete for paving and other applications. Standard AC is manufactured at elevated temperatures, which liquefy the bitumen and ensure that aggregate particles are well coated during mixing. The heating consumes a large amount of energy, particularly when ambient temperatures are low. The mixed AC must be kept warm during transport as well. Prior-art reinforcing fiber additives, such as those described in U.S. Pat. No. 9,469,944, rely on manufacturing heat to release fibers held together by a meltable binder, where both the fibers and the binder substance end up in the finished AC mix.

In many applications, however, lower-temperature binders may be preferred: less energy is required to make and transport the AC, and the service conditions may not demand the high-temperature performance of hot-mix AC. Unfortunately, in warm-mix and cold-mix asphalt concrete, manufacturing temperatures may not be high enough to melt binders and release fibers from prior-art additives. Thus, in an embodiment of the present invention, reinforcing fibers are soaked with a wetting agent having a higher vapor pressure and/or lower melting point than prior-art binders, so that the fibers are kept together for improved handling, but are more easily released into the warm-mix or cold-mix AC during mixing as the wetting agent evaporates or degrades despite the lower process temperatures.

It is important that the reinforcing fibers are delivered into the hot, warm or cold-mix asphalt as a bundle which can subsequently disintegrate upon mixing and become dispersed in the asphalt mix. Effective and uniform distribution of fiber filaments in the asphalt upon mixing is essential for improving mechanical properties of asphalt. This process is aided by techniques to preserve fiber bundle integrity at all stages of handling and feeding prior to the point of immediate mixing fibers with asphalt. Preservation of bundle integrity is originated and maintained at the fiber precutting, cutting and packaging stages. At each of these stages, fiber may be subjected to a treatment with a wetting liquid. The integrity of fiber bundles is related to exposure of fibers to a suitable wetting liquid, penetration of wetting liquid into the interfibrillar space and the retention of substantial amount of liquid in such space. In general, fiber filaments inside the bundles are separated by a narrow space, which may be thought of as a thin film.

This film imposes a disjoining pressure onto the filaments. In a case when such separating film is air (which corresponds to the case of dry fibers) the disjoining pressure is negative and promotes film thinning until total disappearance which leads to a direct contact between the filaments. As a result, a bundle of dry filaments or fibers tends to lose its integrity prematurely, before mixing with asphalt. This situation is unfavorable for successful delivery of reinforcing fibers into asphalt mix. Premature contact between dry filaments and groups of filaments will interfere with the effective dispersion of the fiber bundles upon mixing with the asphalt. This situation is principally different when the film separating the filaments is liquid. In this case disjoining pressure is positive and resists thinning of the film, resulting in an increased bundle integrity. Formation of thin liquid film between the filaments is strongly affected by capillary phenomena in the gap between fibers and fiber filaments making a bundle.

Capillary phenomena are related to the curvature of surfaces. Curvature leading to the origination of capillary phenomena may be both the curvature of liquid surface as well as the geometric curvature of fiber filament surfaces. Capillary pressure strongly depends on the surface tension of the liquid, on the interaction between the liquid and the filament surface and the distance between filaments. Capillary pressure leads to the origination of capillary attractive force between the fibers or filaments separated by a film of wetting liquid filling the gap between the fibers or filaments.

The magnitude of capillary attractive force is strongly dependent on the amount of liquid in the gaps between filaments and on how well the liquid wets the filaments. Wetting of the filament by a liquid strongly depends on the nature and types of filaments and a liquid and can be described by a contact angle. Definition and means of determining contact angles would be known to a person skilled in the art. Strong capillary attractive force helps preserve the integrity of fiber bundles and also prevents the settling out of liquid due to gravity and ensures that the right amount of liquid is retained by the bundle.

Preferably the liquid most suitable for preserving fiber bundle integrity would be a wetting liquid forming the contact angle on the fiber surface in air of less than 90°. Without limitations, the wetting can be a pure liquid, a liquid containing impurities, a mixture of liquids or a solution of a solid, of another liquid or gaseous substance in a liquid. Wetting liquid can also comprise a dispersed phase of solid particles, liquid droplets or gas. Wetting liquid can be a suspension, an emulsion, a microemulsion or a foamed liquid. Wetting liquid may comprise a surfactant or a mixture of surfactants. The condition for a liquid to wet the fiber filament is that the surface tension at a filament-air interface is greater than surface tension at fiber-liquid interface. Surface tension at filament-air interface is also known as the surface energy of fiber filament. Certain liquids which are also suitable for preserving fiber integrity may reveal spreading behavior on the fiber surface without establishing an equilibrium value of contact angle. In the case of spreading, the work of adhesion between filament surface and a liquid is greater than the work of cohesion in a liquid. Definitions of work of adhesion, work of cohesion and specific differences between wetting, spreading and non-wetting would be known to a person normally skilled in the art.

It is also known that aramid fibers may contain microscopic voids that may be filled with substantial amounts of salt. Salt present in the voids may become dissolved in the liquid chosen to preserve bundle integrity and thus may impact the choice of a liquid suitable for preserving fiber integrity. A person ordinary skilled in the art would know how to account for the dissolution of internally present salt in the choice of a suitable liquid.

In one embodiment, the wetting agent is water. In other embodiments, the wetting agent may be mostly water, but may be treated with a surfactant or pH modifier to improve wetting of the reinforcing fiber bundles. The reinforcing fibers may be, for example, aramid fibers. Each bundle may contain 250-15,000 individual filaments. Each filament in a bundle may be substantially the same length, and bundles may be prepared by soaking a rope or yarn of fibers and then cutting it into segments of a desired length. The fiber bundles prepared this way contain filaments that are mostly parallel.

FIG. 1 illustrates aspects of a manufacturing line for making ACC reinforcing fibers according to an embodiment of the invention. At the left (input) side, a plurality of spools of continuous reinforcing fiber 100 are brought together 110 and then soaked through with a liquid, for example by passing through a liquid bath 120. The number of spools is chosen to give a total fiber filament count in the desired range (e.g., approximately 12,000 total filaments). A production line may comprise several sets of spools, with each set combined to reach the target filament total.

After being thoroughly soaked, the wetted fibers may be drawn through a sized orifice 133 or pulled over a round bar 136 at a suitable tension level, either of these processing steps being effective to wring excess liquid from the wetted fibers. After wringing, the wet, continuous fiber filaments 140 may have a fiber-to-liquid ratio of about 3:1 (by weight—75% fiber, 25% liquid).

Next, the continuous wet fiber filaments 140 are severed (blade 150) into segments of approximately uniform length, 160. Lengths from about 10 mm to about 125 mm have industrial applications, but a particularly useful length range is from about 15 mm to about 25 mm. A good general-purpose fiber additive consists of 18 mm lengths of the wetted fiber filaments. The cutting process tends to flatten the fiber bundles, so each bundle 170 is like a sheaf of similar-length fibers held together loosely by the liquid in which the continuous fiber was soaked.

After severing, the fiber bundles or sheaves should be handled carefully to avoid fragmentation into smaller portions. An air conveyor may be used to move the bundles gently from the cutter and into packaging 190. Packaging should be sealed to discourage evaporation of the liquid holding the fibers of each bundle together. Ideally, the reinforcing fibers should be packaged to survive shipping and storage, and to arrive at the point of use with about 25±5% moisture content (by weight). Even if the reinforcing fiber bundles dry out more than this, they may not fall apart or deteriorate into thousands of individual fibers, but material handling and performance are improved if the fibers of each bundle behave as a single cohesive unit until the fibers are introduced into an asphalt cement concrete blend during mixing.

Excessively wet fibers are disfavored because introducing excess liquid into the mixing drum at an asphalt plant creates steam and cools the asphalt mix. Fibers that are too dry can clump or cake together, absorbing bitumen that should be distributed around and among aggregate particles; clumped fibers are also unavailable to tie aggregate particles together.

Figure 2:
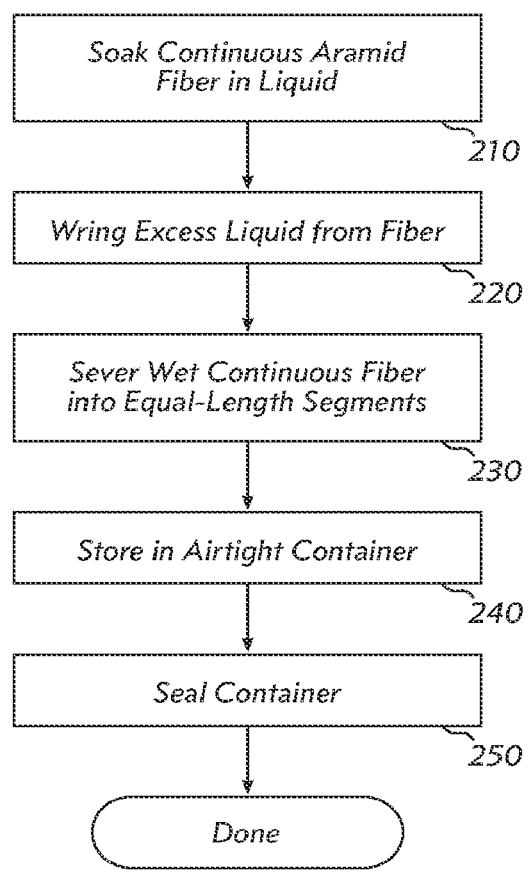
FIG. 2 is a flow chart outlining a method of manufacture of an embodiment.
Figure 3:
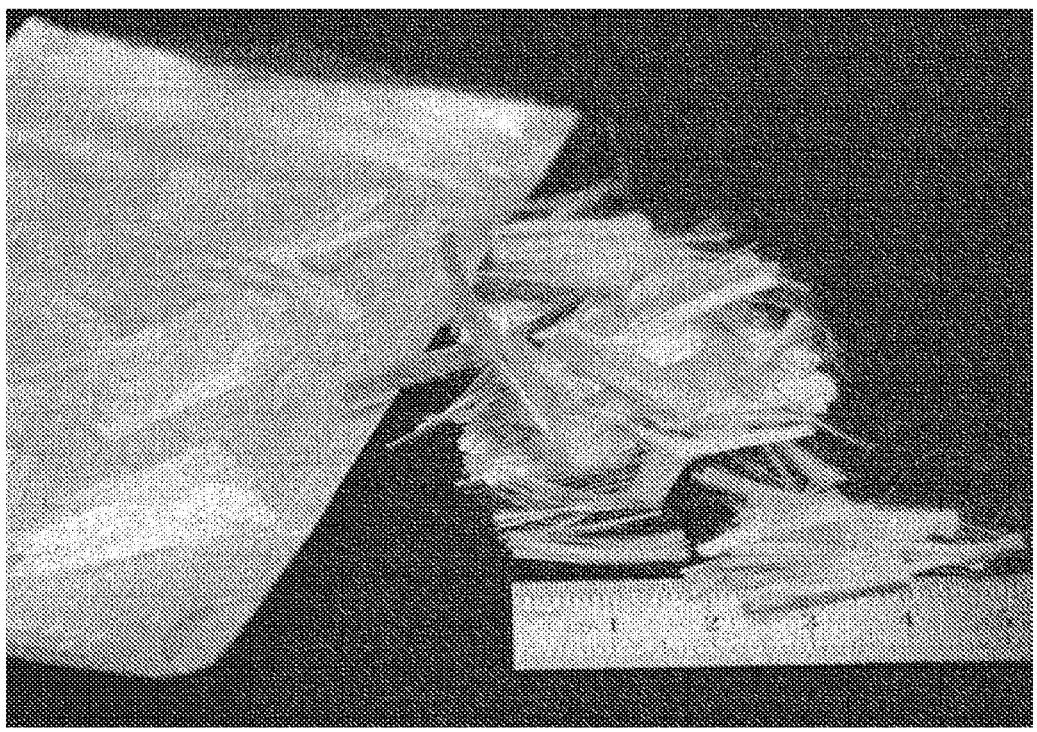
FIG. 3 is a photograph of a sample of an embodiment of the invention in an airtight pouch.
Figure 4:
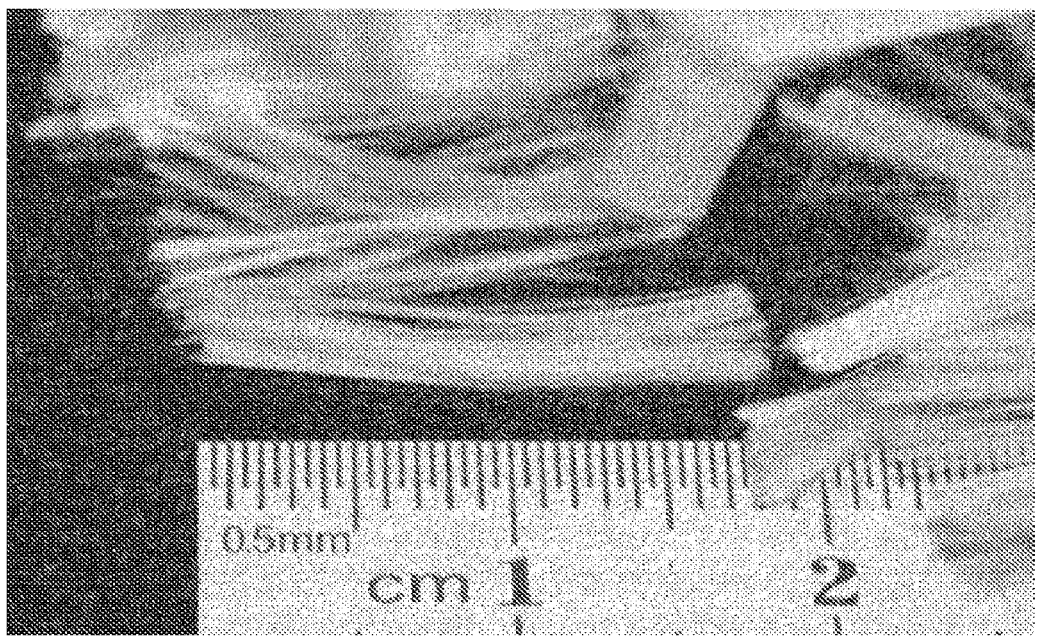
FIG. 4 is a photograph of several bundles of aramid fibers of uniform length, held together loosely by a liquid wetting agent.
Figure 5:
FIG. 5 is a photograph of several bundles of aramid fibers of uniform length, where some individual fibers have become separated from their bundles.

FIG. 2 outlines a method for manufacturing an asphalt cement concrete additive according to an embodiment of the invention. First, a continuous aramid fiber bundle is soaked in a liquid (210). As shown in FIG. 1, this bundle may be comprised of smaller bundles from a plurality of similarly-sized spools, brought together and then soaked in the liquid to produce a wet continuous aramid fiber bundle having between about 250 and about 15,000 individual aramid filaments (a 12,000 filament bundle works well).

Next, excess liquid is wrung from the wet continuous aramid fiber bundle (220), for example by passing the bundle through a sized orifice or across a round bar that serves to scrape or squeegee excess liquid. After this step, the wet continuous aramid fiber bundle should have an aramid-to-liquid ratio of about 3:1 by weight.

Now, the wet continuous aramid fiber is severed into segments of approximately equal length (230), said length being between about 10 mm and about 125 mm (more preferably, between 15 mm and 25 mm, and ideally [for wide applicability across pavement types] about 18 mm). Each of the segments consists of a number of aramid filament segments held together loosely by the liquid. Each segment has about the same number of filaments as the original continuous aramid fiber bundle (thus, between about 250 and about 15,000 filaments, and in a particular instance, about 12,000 filaments).

The severed segments are transferred gently to an airtight container (240) and are sealed therein (250) to slow or stop the evaporation of the wetting agent prior to the addition of the reinforcing-fiber segments into an asphalt cement concrete mixture.

Reinforcing Fiber Selection

A variety of thin, monofilament or branched fibers are acceptable for use in an embodiment of the invention. For example, one may use polyethylene, polypropylene or nylon, provided that their temperature characteristics are compatible with the temperatures and conditions in the mixing environment. However, in view of the conditions under which embodiments are often used, aromatic polyamide fibers ("aramids") are preferred. Aramid fibers have good strength and excellent heat-resistance characteristics.

Plain aramid fibers are acceptable, but one may also use fibers that have been treated to alter their surface structure or chemical activity, or coated with a material in a process generally referred to as "sizing." Fiber treatments and coatings may alter the fibers' physical shape (e.g., making straight filaments curly or kinky), or may create sites at which certain chemical bonds are easier to form. Treatments that affect individual filaments should not be confused with the wetting agent applied to bundles of filaments (i.e., yarns) to create wetted bulk reinforcing fiber.

In some embodiments, mixtures of fibers may be used. For example, a yarn comprising both aramid fibers and glass fibers may be treated as described, or separate aramid and nylon fiber yarns may be treated independently, then combined into a multi-fiber rope before segmentation and mixing.

Wetting Agent Selection

The main function of a wetting agent in an embodiment of the invention is to hold a bundle of reinforcing fibers together tightly enough to prevent the individual filaments from escaping from the asphalt concrete mixture into the air (or elsewhere that they are not wanted), but not so tightly that the filaments remain clumped together in the finished AC. A suitable wetting agent is one that impedes friation of the reinforcing fibers in a severed segment until the segment is introduced into an AC mixture, and that thereafter sheds filaments from the bundle under the agitation or churning conditions of a mixing plant so that most or all of the filaments in the segment separate and are distributed between and among aggregate particles within the amount of time the mixture is being worked. Note that this time may be significantly shorter than the five to twenty minute mixing time of cement concrete: an asphalt plant making tons of product per hour may only mix ingredients for five to twenty seconds.

Water is often suitable for use as a wetting agent: it is inexpensive, readily available, does not harm most AC mixtures, and evaporates cleanly under most environmental conditions. Water may also be treated with a surfactant (e.g., soap) to improve penetration into the reinforcing fiber yarn. Treatment with an acid or base to adjust the pH may improve adhesion among filaments, asphalt binder and aggregate particles, or may prevent mold and mildew from forming on wet fiber segments in storage. For extremely low temperature use, a wetting agent with a lower freezing point, such as an alcohol, may be used. In some embodiments, the wetting agent may oxidize or degrade when exposed to air, to light, or to other ingredients in the AC mixture, and some or all of the subcomponents of such degradation may evaporate or depart from the finished AC.

A basic asphalt process mixes ingredients between about 130° C. and 165° C., but warm-mix and cold-mix asphalt cement may be worked and installed at much lower temperatures, such as 0° C., 25° C. or 50° C. Wetting agents that are liquid at those temperatures, and that evaporate or disappear from the mix (leaving the filaments behind) are preferred.

Alternate Process

Although the preferred process is to treat a linear bundle of reinforcing fibers (e.g., a spool of yarn) with a wetting agent and then to sever the treated bundle into segments of a suitable length, it is also possible to soak pre-cut fibers of uniform or random lengths in the wetting agent. This produces a damp or wet amorphous gloppy mass from which clumps can be added to asphalt concrete during mixing. The fibers in clumps of this material are oriented more-or-less randomly, unlike the mostly-parallel fibers in treated, severed yarns. Like the soaked yarn segments, these clumps shed reinforcing fibers into the asphalt during mixing, but not as evenly, and it may be more difficult to meter this material.

Reinforcing Fiber Ratio Considerations

As discussed previously, embodiments of the invention produce significant asphalt performance increases with fairly small quantities (by weight or percentage) of reinforcing fibers. For example, adding one kilo of aramid fibers per metric ton of asphalt mix is an 0.1% ratio. (Note that the wetting agent present in an embodiment is a substantial fraction of the weight of the bare fibers, so a recipe calling for 1 kg of aramid fibers per metric ton may actually introduce up to about 1.5 kg of the inventive soaked reinforcing fiber per ton of asphalt, but the additive is still a miniscule fraction of the total asphalt cement concrete weight.)

Introducing significantly larger quantities of treated reinforcing fiber may be economically infeasible (the aramid fiber is more expensive than aggregate and bitumen), and the numerous, fine filaments provide a large total surface area onto which the bitumen can become coated. In effect, excessive fiber may soak up bitumen and interfere with adequate coating of the aggregate particles. Therefore, it is important not to assume that "some fibers are good, so more must be better." Adding more fibers may provide an additional beneficial reinforcing effect, but it may also require adjustment of other ingredient ratios to maintain the expected performance and characteristics of the resulting asphalt concrete. Such a mixture adjustment may increase the cost out of proportion with the improved performance realized.

The materials and processes of the present invention have been described largely by reference to specific examples and in terms of particular fibers and wetting agents. However, those of skill in the art will recognize that reinforcing fibers can be introduced into and distributed throughout an asphalt cement mixture by coating or soaking the fibers with a variety of different liquids, and cutting or dividing them in a variety of ways, without departing from the principles of the invention. Such variations and alternate methods are understood to be captured according to the following claims.

What is claimed is:

1. Aramid fiber bundle segments formed by a method comprising:
    soaking, continuously, different portions of a plurality of continuous aramid fibers in a length direction of the plurality of continuous aramid fibers, in a liquid;
    pulling, continuously, the different portions of the plurality of continuous aramid fibers from the liquid to produce continuous portions of a wet continuous aramid fiber bundle, while wringing by the pulling, continuously, excess liquid from continuous portions of the wet continuous aramid fiber bundle, by applying a level of tension, continuously, to the wet continuous aramid fiber bundle, to increase a ratio of weight of fiber to liquid of the continuous portions of the wet continuous aramid fiber bundle, so that a filament-air interface surface tension in the continuous portions is greater than a filament-liquid interface surface tension in the continuous portions;
    severing the continuous portions of the wringed continuous aramid fiber bundle, continuously after wringing the excess liquid, into aramid fiber bundle segments, each bundle segment of the aramid fiber bundle segments consisting of a plurality of aramid filament segments soaked in liquid and wringed.

2. The aramid fiber bundle segments of claim 1, wherein wringing continuously excess liquid comprises passing the continuous portions of the wet continuous aramid fiber bundle across a round bar under a predetermined tension or through an orifice of a predetermined size, to apply the level of tension.

3. The aramid fiber bundle segments of claim 1, wherein wringing the excess liquid is to increase the ratio to about 3:1.

4. The aramid fiber bundle segments of claim 1, wherein each bundle segment of the aramid fiber bundle segments includes about 12,000 aramid filaments.

5. The aramid fiber bundle segments of claim 1, wherein the liquid includes water.

6. The aramid fiber bundle segments of claim 1, wherein the liquid includes alcohol.

7. The aramid fiber bundle segments of claim 1, wherein the liquid is an emulsion.

8. The aramid fiber bundle segments of claim 1, wherein bundle segments of the aramid fiber bundle segments have a length between 10 mm and 125 mm.

9. The aramid fiber bundle segments of claim 8, wherein the bundle segments of the aramid fiber bundle segments have a length between 15 mm and 25 mm.

10. An airtight packaging containing the aramid fiber bundle segments of claim 1, wherein the airtight packaging is sealed to discourage evaporation of the liquid from the aramid filament segments soaked in liquid.

11. An additive for asphalt cement concrete, comprising:
    a plurality of aramid fiber bundles soaked with a wetting agent, each bundle comprising a plurality of aramid filaments of similar length bound together by surface tension of the wetting agent,
    wherein a filament-air interface surface tension in bundles among the plurality of aramid fiber bundles is greater than a filament-liquid interface surface tension in the bundles,
    wherein a ratio of weight of the plurality of fiber to weight of the wetting agent is about 3:1.

12. The additive of claim 11, wherein the aramid fiber bundles soaked with the wetting agent contain from about 20% to about 30% of the wetting agent by weight based on a weight of the aramid fiber bundles soaked with the wetting agent.

13. The additive of claim 11, wherein each aramid fiber bundle contains between 250 and 15,000 individual aramid filaments.

14. The additive of claim 11, wherein each aramid fiber bundle contains about 12,000 individual aramid filaments.

15. The additive of claim 11, wherein the wetting agent includes water.

16. The additive of claim 11, wherein the wetting agent includes alcohol.

17. The additive of claim 11, wherein the wetting agent is an emulsion.

18. The additive of claim 11, wherein the similar length is between 10 mm and 125 mm.

19. The additive of claim 18, wherein the similar length is between 15 mm and 25 mm.

20. The additive of claim 19, wherein the plurality of aramid fiber bundles is stored in a sealed container operative to retard evaporation of the wetting agent prior to addition of the aramid fiber bundles to an asphalt cement concrete mixture.

\* \* \* \* \*